No. 831,263.
PATENTED SEPT. 18, 1906.
W. C. CARR.
AUTOMATIC TRANSPORTING DEVICE.
APPLICATION FILED JUNE 5, 1906.
4 SHEETS—SHEET 2.
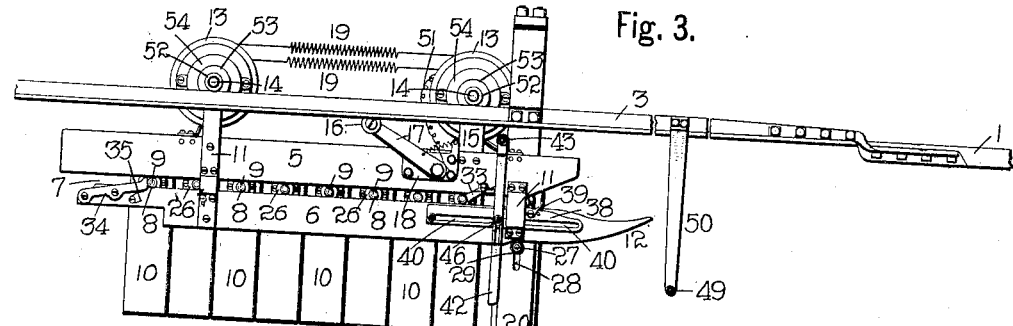
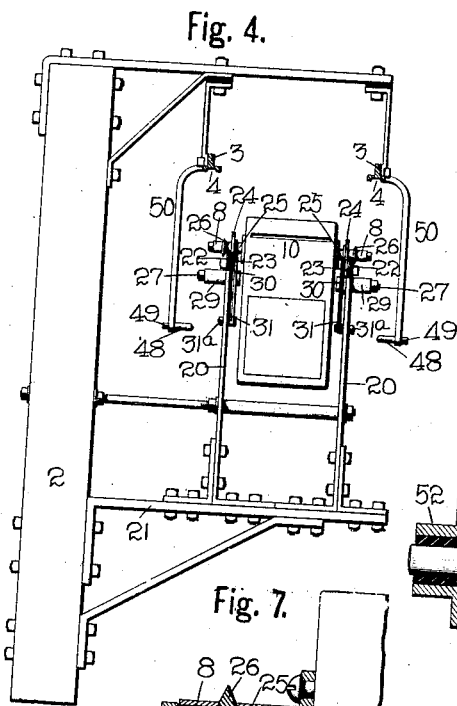
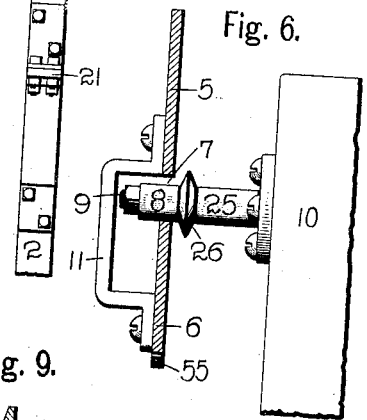
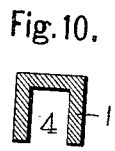
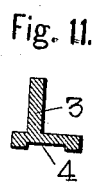
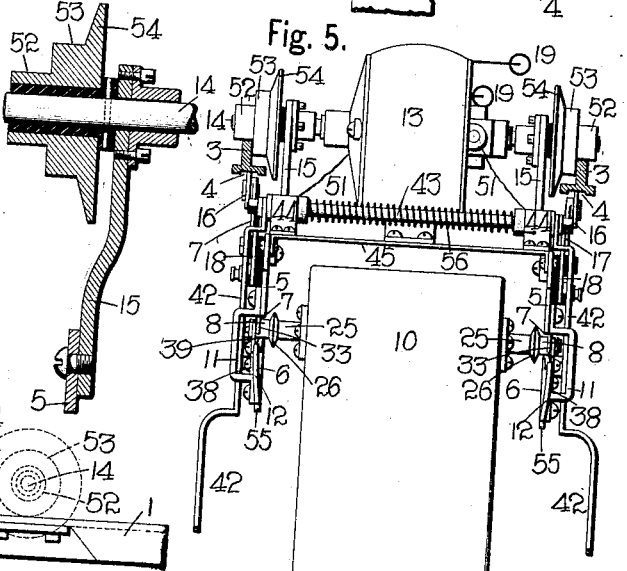
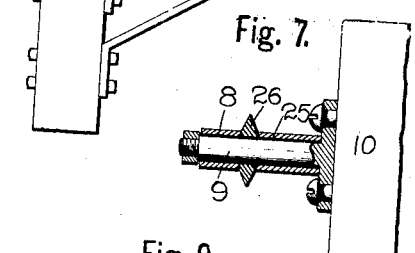
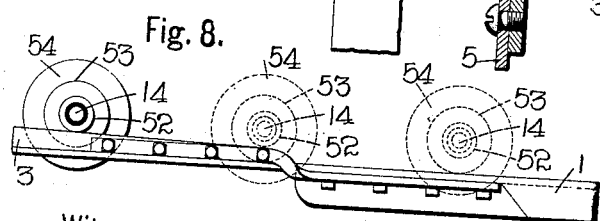
Witnesses.
Inventor.
William C. Carr.
By
Attorney.

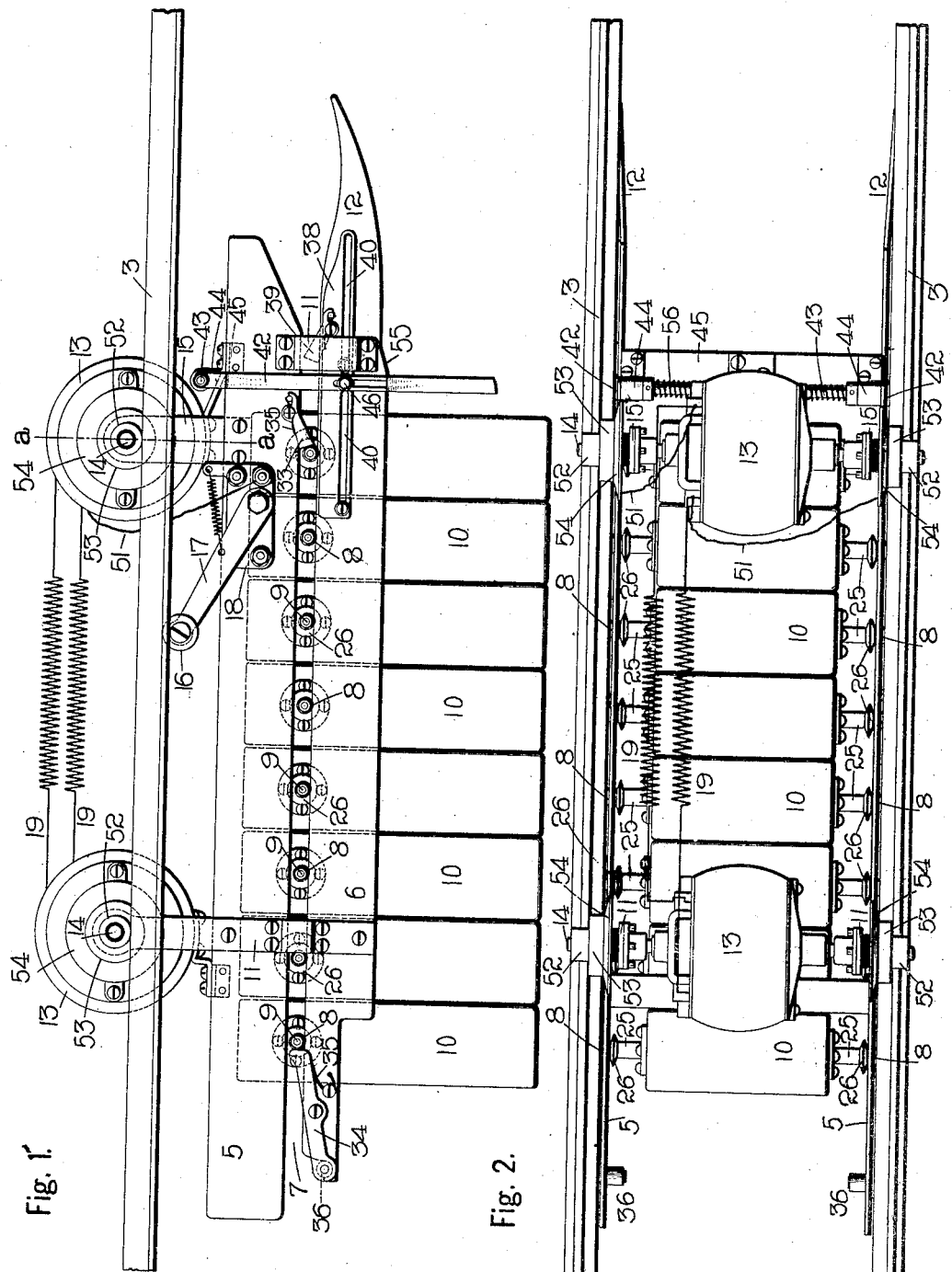

No. 831,263. PATENTED SEPT. 18, 1906.
W. C. CARR.
AUTOMATIC TRANSPORTING DEVICE.
APPLICATION FILED JUNE 5, 1906.
4 SHEETS—SHEET 3.
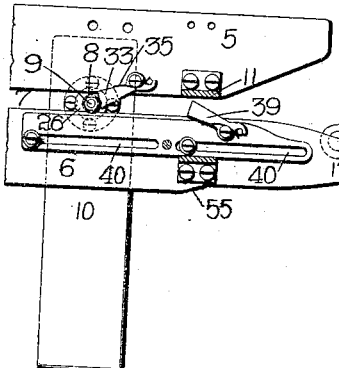
Fig. 12.
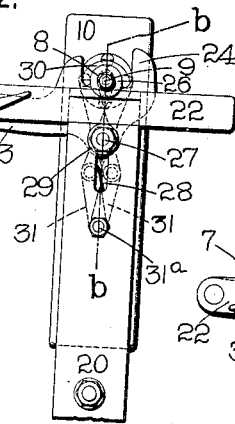
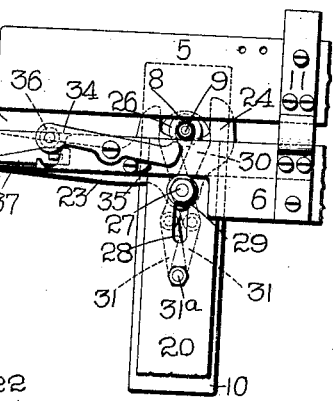
Fig. 15.
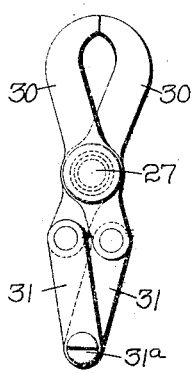
Fig. 18.
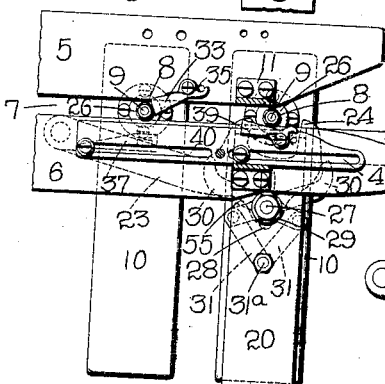
Fig. 13.
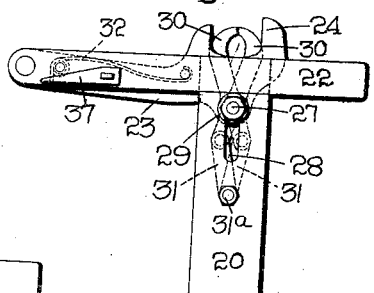
Fig. 16.
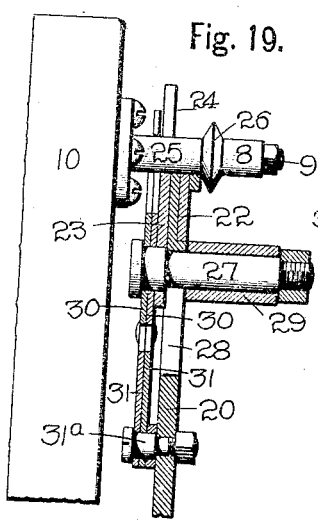
Fig. 19.
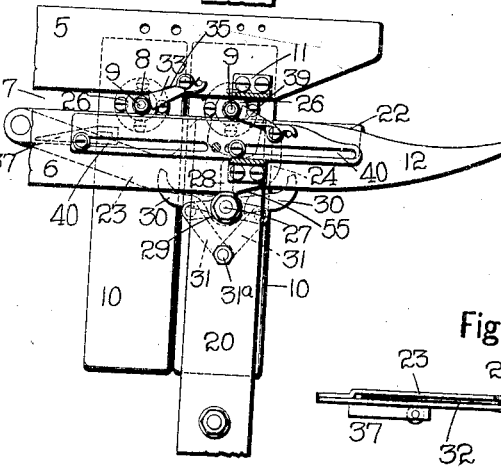
Fig. 14.
Fig. 17.
Witnesses.
L. M. Sangster.
Geo. A. Neubauer.
William C. Carr. Inventor.
By A. J. Sangster
Attorney.

No. 831,263. PATENTED SEPT. 18, 1906.
W. C. CARR.
AUTOMATIC TRANSPORTING DEVICE.
APPLICATION FILED JUNE 5, 1906.
4 SHEETS—SHEET 4.
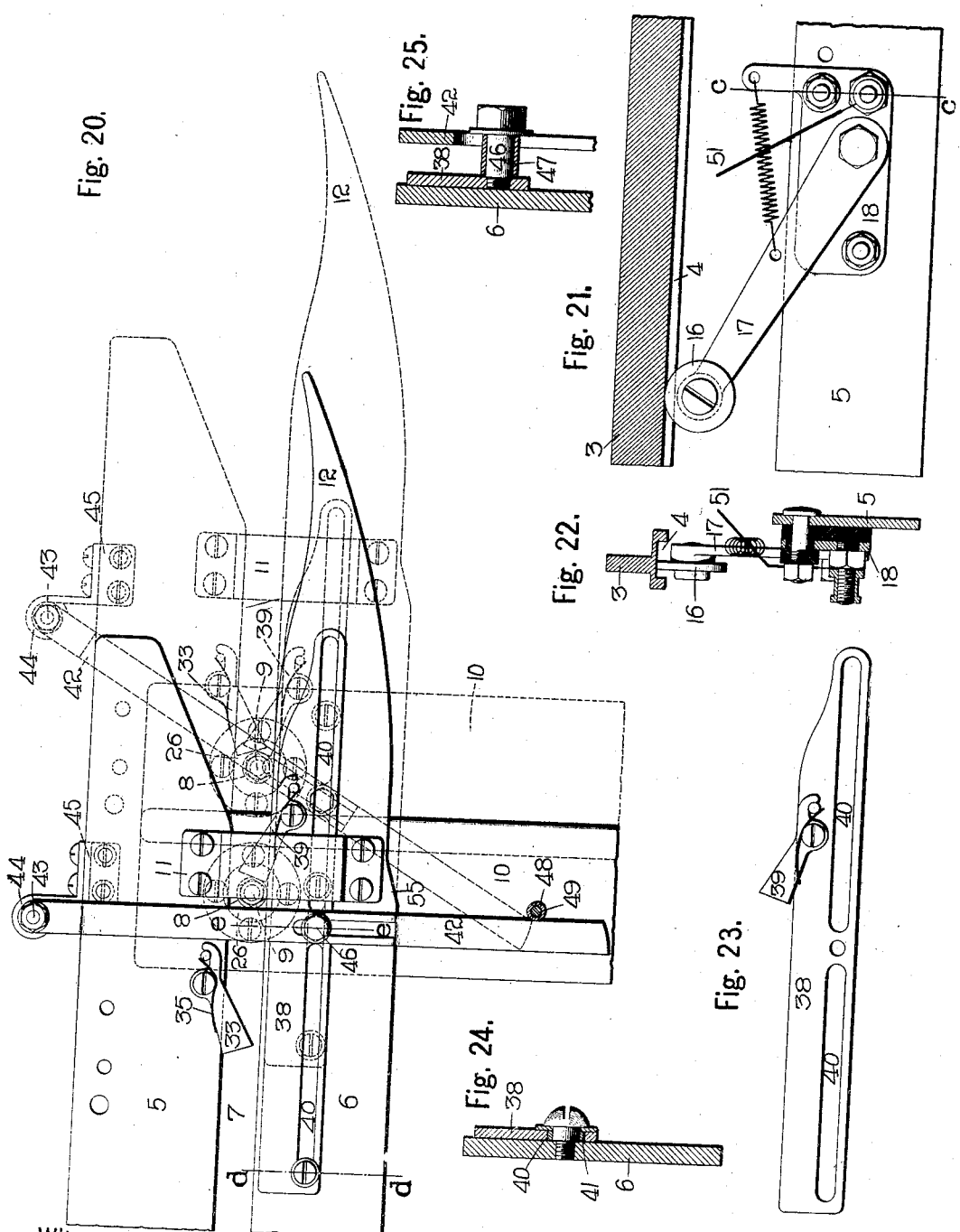
Witnesses
L. M. Sangster.
Geo. A. Neubauer.
William C. Carr Inventor.
By  Attorney.

UNITED STATES PATENT OFFICE.

WILLIAM C. CARR, OF BUFFALO, NEW YORK.

AUTOMATIC TRANSPORTING DEVICE.

No. 831,263.

Specification of Letters Patent.

Patented Sept. 18, 1906.

Application filed June 5, 1906. Serial No. 320,249.

*To all whom it may concern:*

Be it known that I, WILLIAM C. CARR, a citizen of the United States, residing at Buffalo, in the county of Erie and State of New York, have invented a certain new and useful Improvement in Automatic Transporting Devices, of which the following is a specification.

This invention relates to an improved automatic transporting system; and the object of the invention is to provide means for economically delivering and collecting packages, mails, or other articles to and from a series of stations.

The invention also relates to certain details of construction, all of which will be fully and clearly hereinafter described and claimed, reference being had to the accompanying drawings, in which—

Figure 1 is a side elevation of the improved automatic transporting device with a fragment of the rail from which it is suspended. Fig. 2 is a top plan view of the improved automatic transporting device. Fig. 3 is a side elevation of the improved automatic transporting device, showing the car just entering a station. Fig. 4 is an end elevation of one of the stations. Fig. 5 is an end elevation of the improved automatic transporting device, showing a section through the rails. Fig. 6 is a fragmentary view showing the manner of supporting the box or package from the car, showing a section through the frame of the car. Fig. 7 is a fragmentary view of one of the boxes, showing a section through the rollers. Fig. 8 is an enlarged fragmentary side view of portion of one of the rails, showing the manner of changing the speed of the car. Fig. 9 is an enlarged fragmentary section through one of the wheels and the frame on line *a a*, Fig. 1. Fig. 10 is an enlarged transverse section through one of the main rails. Fig. 11 is an enlarged transverse section through one of the rails at a station. Figs. 12, 13, and 14 are enlarged fragmentary side views of the car and a station, showing the operation of the car as it picks up a box. Fig. 15 is an enlarged fragmentary side view of the car and a station, showing the manner of delivering a box. Fig. 16 is an enlarged fragmentary side view of a station. Fig. 17 is a plan view of the portion of the station shown in Fig. 16. Fig. 18 is an enlarged detached view of the lock for locking the box in place at a station. Fig. 19 is an enlarged section on line *b b*, Fig. 12. Fig. 20 is an enlarged fragmentary side elevation of the front end of the car, showing the manner of shifting the remaining boxes after one has been delivered. Fig. 21 is an enlarged side view of the trolley device and a fragment of the car-frame, also showing a section through the rail. Fig. 22 is a section on line *c c*, Fig. 21. Fig. 23 is a side view of one of the horizontally-slotted bars, carrying the dog for shifting the boxes on the car. Fig. 24 is an enlarged section on line *d d*, Fig. 20. Fig. 25 is an enlarged section on line *e e*, Fig. 20.

In the preferred type of the invention illustrated in the drawings, the delivering and collecting car is supported upon elevated rails, which also serve to conduct electricity to the motors operating the car. The rails are supported parallel and at a suitable distance above the ground by supports, and stations to and from which deliveries and collections are made are located at suitable points. The car is suspended from the rails and has two parallel side members and means for supporting boxes between the side members.

*The rails.*—The rails 1 are supported above the ground by standards 2, being insulated from the standards in the usual manner, and are provided with means for automatically reducing the speed of a car before entering a station. This means consists of raised flanges 3 on the rails, which extend for suitable distances on each side of stations and support the car in the manner to be hereinafter specifically described. The bottom surfaces 4 of the rails are grooved out to form a channel in which the trolley-wheel runs.

*The car.*—The car consists of two parallel side members, and as both sides of the car are similar in construction a description of one side will suffice for both. Each of the side members is composed of an upper portion 5 and a lower portion 6, separated sufficiently to leave a slot 7, in which rollers 8, rotatably mounted on short rods 9, extending from opposite sides of boxes 10, travel. The upper and lower portions 5 and 6 are rigidly connected together by metal straps 11. The lower portion 6 is shaped somewhat like the runner of a skate, having a tapering and curved forward end 12, the purpose of which will be explained farther on.

Two rotary electric motors 13 are preferably employed, which are arranged tandem and are mounted directly upon the front and rear axles 14, from which the car is suspended by metal straps 11 and 15. The electric current for driving the motors 13 is conducted from the rails by trolley-wheels 16, which travel in the grooves 4 and are journaled in the upper ends of the trolley-arms 17. These arms are pivoted at their lower ends to metal plates 18, which are bolted to the upper portions 5 of the side members, but are insulated therefrom. (See Figs. 21 and 22.) The two motors are connected by conducting-wires 19, so that but one need be supplied with trolley-wheels. The front and rear of the slot 7 are normally closed when the car is traveling and are automatically opened at a station to permit the picking up of a box at the front and the dropping of a box from the rear end. The automatic mechanism for freeing the slot-passage to permit the reception and removal of boxes is partially mounted on the car and partially mounted on the station.

The stations are constructed as shown in Figs. 3, 4, and 12 to 19, inclusive. Each station is supported from one of the standards 2 and consists of two vertical parallel bars 20, which are supported by a horizontal bar 21, secured to the standard 2, and mechanism at the upper ends of the bars 20 for supporting and holding a box in locked condition until the arrival of the car, when the box is automatically released and picked up by the car. The mechanism supported by the parallel vertical bars 20 consists of a horizontal bar 22, secured to the upper end of each bar 20 and extending parallel with the rails 1, a lever 23, pivoted at one end to each bar 22 and having its other end forked, as at 24, the fork extending in a vertical direction, and a toggle locking device supported by each vertical bar 20 and operatively connected to the adjacent forked lever 23, so as to operate in unison therewith. The levers 23 are located so that the forks 24 straddle rollers 25, mounted on the rods 9, and which are separated from the rollers 8 by washers 26. A bolt 27 passes through each lever 23 below the fork 24 and through a vertical slot 28 in each vertical bar 20, said bolt carrying a roller 29 on its outer end, which is held in place by a nut. Two toggle-levers 30 are pivoted at intermediate parts on the bolt 27, so as to be adjacent to the levers 23, said levers 30 having their upper ends curved toward each other, so that when in normal position the upper ends of the levers 30 lock over the rollers 25, as shown in Fig. 12. Two links 31 are pivoted at their lower ends to each of the vertical bars 20 by a bolt 31ᵃ and have their upper ends pivoted to the lower ends of the toggle-levers 30 by pins. (See Fig. 18.) The levers 23 are normally maintained in their upper position and the toggle-levers locked over the rollers by springs 32, which are secured at one end to pins on the horizontal bars 22 and at their opposite ends by pins projecting from the levers 23. (See Fig. 16.) The front end of the slot 7 of the car is closed by a dog 33, which is pivoted by a screw to the upper portion 5 of the side frame member, and the rear end by a dog 34, which is pivoted by a screw at about its middle to the rear end of the lower portion 6 of the side frame member. (See Figs. 1, 3, and 15.) These dogs are located so that the rear end of the dog 33 and the front end of the dog 34 contact with the rollers 10 on the first and last boxes. (See Fig. 1.) The dogs are maintained in locking position by springs 35. A roller 36 is supported at the rear end of the dog 34, and said roller is adapted to travel on the beveled top surface of a block 37, which is secured to the bar 22, and so rock the dog on its pivoting-screw to free the rear end of the slot 7. The rear end of the lower portion 6 of each side frame member is cut away at its bottom edge, so that the rear end of the portion 6 is narrower than the remainder. The purpose of this will be explained farther on. After a box has been removed from the car at a station the remaining boxes are shifted rearwardly, so as to provide room at the front of the car to pick up the next box on the route. This is done automatically by mechanism located at the front of the car and illustrated in Figs. 1, 2, 3, 5, and 20. A slotted plate 38 is slidably secured to the front end of the lower portion 6 of each side frame member, and said plate carries a dog 39 near its front end, said dog being pivoted to the plate by a screw. (See Fig. 20.) The plate 38 is secured to the side frame members by two screws which pass through the slots 40 in the plate. Rollers 41 encircle the portions of the screws within the slot, so that the plate slides easily back and forth. (See Fig. 24.) A vertical lever 42 has its upper end secured to each end of horizontal shaft 43, which is journaled in bearings 44, secured to a transverse brace-bar 45, the ends of which are bolted to the inner sides of the upper portions 5 of the side frame member. This lever 42 is slotted at an intermediate point, and a pin 46, extending from about the middle of the sliding plate 38, carries a roller 47, which rides in said slot. (See Fig. 25.) The lever 42 is adapted to contact with a roller 48, carried by a pin 49, extending inwardly from the lower end of a depending arm 50, which is secured at its upper end to each rail. (See Fig. 3.)

The operation of this improved transporting device is as follows: The line is constructed on the loop system—that is, beginning and ending at a central station from which the car starts and at which it completes its run. The car is loaded with the proper number of boxes, the boxes being placed so that the box to be delivered at the first station will be the last box on the car, that to be delivered at the second station will be the second last, and so on, the last box to be delivered being the first on the car. The current is now applied to the rails and is conducted through the trolley-wheels 16, trolley-arms 17, metal plates 18, and wires 51, to the motors 13, thereby causing the axles 14 to revolve. The ends of these axles are provided with wheels, which are formed as shown in Figs. 1 and 9. Each wheel has two peripheries or treads 52 and 53 of different diameters, the tread 53 being approximately twice the diameter of the tread 52. A flange 54 is formed integral with each wheel, said flanges serving to maintain the wheels on the rails. The wheels are insulated from the axles by a core of insulating material to prevent short-circuiting through the axles. When the car is traveling between stations, the larger treads 53 of the wheels ride the rails 1, causing the car to travel at a comparatively high rate of speed. As the car nears a station, however, the wheels strike a section of the rail which differs from the main line. This section of the rail has a raised portion 3, the ends of which taper down to meet the main line on either side of the station. As the car travels toward the station the smaller treads 52 of the wheels run upon the raised portions 3 of the rails, thereby raising the treads of larger diameter from the track and reducing the speed of the car, owing to the smaller diameter of the wheels which now support the car. By this means the speed of the car is automatically reduced without reducing or changing the speed of the motors. When the car reaches the first station, the bottom edge of the curved forward end 12 of the lower portion 6 of each side frame member contacts with the roller 29 on the bolt 27 of the box-supporting mechanism and as the car advances moves the roller and bolt downward from the position shown in Fig. 12 to the position shown in Fig. 13. This carries the forked end of the lever 23 downward and also opens the toggle locking-levers 30, as shown in said Fig. 13, while at the same time the dog 39 on the slotted plate 38 is pressed down by the roller 8 on the rod 9, extending from the box 10, which is supported at the station. At this point the rollers 8 are just entering the slot 7 of the car. (See Fig. 13.) The continued advance of the car forces the roller 29 still farther downward as it comes in contact with the short diagonal portion 55 of the lower edge of the portion 6 and releases the box from both the forked levers 123 and the toggle locking-levers 30, while at the same time the dog 39 is released and returns to its normal position, as shown in Fig. 14. The box is now supported from the car, the rollers 8 having entered the slots 7. (See Fig. 14.) While the car advances the forked lever 23 and the toggle locking-levers are maintained in their open position, as the roller 29 is held down by the bottom edge of the lower portion 6 of the side frame members. The car passes through the station and when the last box on the car is vertically above the forked ends of the levers 23 the roller 29 is released by the cut-away portion of the rear end of the portion 6, and the levers 23 and the toggle locking-levers resume their normal position, at the same time straddling and locking over the rollers 25 on the rods 9 extending from the last box on the car. At this time the roller 36 on the dog 34 engages with the beveled top surface of the block 37 and rocks the dog on its point, thereby freeing the rear end of the slot 7 and permitting the box to pass therefrom. When the car has passed the station, the levers 42 strike the rollers 48 at the lower ends of the depending arms 50, and as the car advances the slotted plates 38, carrying the dog 39, are moved backward, the dogs 39 carrying the box therewith until the rollers 8 pass beneath the dogs 33, when the levers 42 are released from the rollers 48 and return to their normal position. The levers are returned to their positions by a torsion-spring 56, which encircles the shaft 43. (See Figs. 2 and 5.) The car now continues to the next station, where the same operation is repeated, and so on until it reaches the central station, where the boxes which it has picked up are taken therefrom and the contents removed.

I claim as my invention—

1. In a device of the class described, the combination with the rails, of a car supported from said rails and having side slots and a plurality of boxes slidably mounted in the side slots in said car.

2. In a device of the class described, the combination with the rails, of a car supported from said rails and provided with at least one side slot and a plurality of boxes supported in said side slot.

3. In a device of the class described, the combination with the rails of a car suspended from the rails and a plurality of boxes having side projections slidably supported by said car.

4. In a device of the class described, the combination with the rails, of a delivering and collecting car supported from the rails and having two parallel opposite side slots and at least one box slidably supported in said side slots.

5. In a device of the class described, the combination with the rails, of a delivering and collecting car supported from the rails and having opposite side slots, a plurality of boxes slidably supported in said slots and automatic mechanism for delivering a box from said car at a desired point.

6. In a device of the class described, the combination with the rails of a delivering and collecting car supported from the rails and having opposite side slots, a plurality of boxes slidably supported in said slots, and automatic mechanism for collecting one box and delivering another box at a desired point.

7. The combination with rails, of an automatic collecting and delivering mechanism supported by said rails and a plurality of boxes slidably supported from their sides only by said mechanism.

8. The combination with rails, of an automatic collecting and delivering mechanism supported by said rails and including a driving means, and a supporting means having at least one side slot in which a plurality of boxes are supported.

9. In a device of the class described, the combination with the rails, of a car supported from said rails and including two side members, each provided with a slot and a plurality of boxes supported in said slots.

10. In a device of the class described, the combination with the rails, of a car supported from said rails and including two side members, each of which is composed of upper and lower portions separated sufficiently to leave a slot and a plurality of boxes supported in said slots.

11. In a device of the class described, the combination with the rails and a station, of a skeleton car supported by the rails and having side members connected together at the top only, and at least one box removably supported from the side members only of said car.

12. In a device of the class described, the combination with the rails and a station, of a car supported by the rails at least one box supported by said car, at least one box supported by said station, means for normally locking a box to the car to prevent displacement, and automatic means for moving said locking means to free the box when the car is passing the station, whereby one box is dropped and another picked up as the car passes the station.

13. In a device of the class described, the combination with the rails and a station, of a car supported by the rails at least one box supported by said car, at least one box supported by said station, means for normally locking a box to the car to prevent displacement, and automatic means supported from the station for moving said locking means to free the box when the car is passing the station, whereby one box is dropped and another picked up as the car passes the station.

14. In a device of the class described, the combination with the rails and a station, of a car supported by the rails and having a slot in which a plurality of boxes are supported, means for normally locking the ends of said slot to prevent the displacement of a box, and automatic means for moving said locking means to free the slot when the car is passing the station, whereby one box is dropped and another picked up as the car passes the station.

15. In a device of the class described, the combination with rails, of a skeleton car for collecting and delivering boxes or the like supported from said rails and comprising two side members by which a plurality of boxes are supported, axles mounted on the rails from which the side members are supported and rotary motors on the axles.

16. In a device of the class described, the combination with the rails and at least one station of an automatic collecting and delivering car supported from said rails and comprising two side members connected together only at the top, a box supported by said car between and from said side members only, a box supported by the station, and mechanism whereby said car will automatically collect the station-box and deliver another box to said station.

17. In a device of the class described, the combination with electrically-charged rails, of a car having insulated supporting-wheels engaging the tread-surface of the rails and a trolley-wheel engaging another surface of one of the rails.

18. In a device of the class described, the combination with electrically-charged rails of a car having axles provided with insulated supporting-wheels engaging said rails, an electric motor on an axle and a trolley-wheel also engaging the rails.

19. In a device of the class described, the combination with electrically-charged elevated rails, of a car having supporting-wheels engaging the top surface of the rails and a trolley-wheel engaging the bottom surface of one of the rails.

20. In combination, rails, a station having a box normally locked thereto; a car supported from the rails, and means whereby the car will automatically unlock and collect the box from said station as it passes said station.

21. In combination, rails, a station having a box normally locked thereto, an automatic collecting and delivering car supported from the rails, and means whereby the car will automatically slow down when approaching a station and unlock and collect the box from the station and deliver another box to said station.

22. In combination, rails, a station supporting a box, means for locking the box to the station against involuntary removal, a collecting and delivering car supported from the rails and carrying at least one box and means whereby the car will automatically unlock and collect a box from and deliver a box to said station.

23. In combination, rails, a station having a box locked thereto against involuntary removal, a car supported from the rails, and means whereby the car will automatically unlock and collect the box from said station.

24. In combination, rails, a station, an automatic collecting and delivering car supported from the rails, means whereby the car will automatically slow down when approaching the station and means for locking the box to said station against involuntary removal.

25. In combination, rails, a station, an automatic collecting and delivering car supported from the rails, means whereby the car will automatically slow down when approaching the station and collect a box from and deliver a box to said station, and a toggle locking means for locking the box to said station against involuntary removal.

26. In combination, electrically-charged elevated rails, one at least of which is grooved on its under surface, a station, slow-speed flanges on those portions of the rails in proximity to the station, and an automatic collecting and delivering car suspended from the rails and having wheels engaging the rails, reduced rollers engaging the slow-speed flanges, an electric driving-motor and a trolley-wheel engaging in the groove.

27. In an elevated transporting system, elevated rails, a plurality of stations at suitable distances each having a box normally locked thereto and an automatic collecting and delivering car carrying boxes equal in number to the stations and normally locked in position against involuntary displacement, and means for releasing the box at a station and the boxes supported by the car to permit the car to pick up the box at the station and to deposit another box in place thereof as it passes the station.

28. In an elevated transporting system, elevated rails, a plurality of stations at suitable distances, each having a box normally locked thereto, a car carrying boxes equal in number to the stations, and automatic means for unlocking and collecting the box from each station and delivering another box thereto as the car passes.

29. In combination, rails, a car supported by said rails and having at least one slot, at least one box supported from said slot, a station, means for closing the ends of the slot when the car is traveling and automatic means for opening said slot ends at the station.

30. In combination, rails, a car supported by said rails and having at least one slot, at least one box supported from said slot, a station, means for closing the ends of the slot when the car is traveling and automatic means for opening said slot ends at the station partially mounted on the car and partially mounted on the station.

31. In combination, rails, a car supported by said rails and having at least one slot, at least one box supported from said slot, a station, means for closing the ends of the slot when the car is traveling comprising pivotal dogs and automatic means for opening said slot ends at the station.

32. In combination, rails, a car supported by said rails and having at least one slot, at least one box supported from said slot, a station, means for closing the ends of the slot when the car is traveling comprising pivotal spring-tensioned dogs and automatic means for opening said slot ends at the station.

33. In combination, rails, a collecting and delivering car supported from the rails and carrying at least one box, a station supporting a box, means for locking the box to the station, and means for releasing said locking means to permit the car to remove the box from the station.

34. In combination, rails, a collecting and delivering car supported from the rails and carrying at least one box, a station supporting a box, means for locking the box to the station, and means carried by the car for releasing said locking means to permit the car to remove the box from the station.

35. In combination, rails, a collecting and delivering car supported from the rails and carrying at least one box and a station including two parallel vertical bars and mechanism connected to said bars for supporting a box in position to be picked up by the car.

36. In combination, rails, a collecting and delivering car supported from the rails, and carrying at least one box, a station supporting a box, means for locking the box to the station, a toggle-locking device and means for releasing said locking means to permit the car to remove the box from the station.

37. A skeleton and delivering car comprising two side members connected together only at the top thereby leaving an opening extending longitudinally throughout between said side members and interrupted only by the top connections between said side members and a plurality of boxes supported in said opening by side projections engaging said side members.

38. A skeleton and delivering car comprising two side members connected together only at the top thereby leaving an opening extending longitudinally throughout between said side members and interrupted only by the top connections between said side members, said side members having slots, and a plurality of boxes supported in said openings by side projections engaging in the slots in said side members.

39. A skeleton and delivering car comprising two side members connected together only at the top thereby leaving an opening extending longitudinally throughout between said side members and interrupted only by the top connections between said side members and a plurality of boxes supported in said opening by side projections provided with rollers engaging said side members.

WILLIAM C. CARR.

Witnesses:
L. M. SANGSTER,
GEO. A. NEUBAUER.